United States Patent Office 3,458,561
Patented July 29, 1969

3,458,561
ESTERIFICATION OF ACRYLIC ACID
Carl Theodor Kautter and Ulrich Baumann, Darmstadt, and Karl Heinz Riemann, Darmstadt-Eberstadt, Germany, assignors to Rohm & Haas G.m.b.H., Darmstadt, Germany
No Drawing. Filed Sept. 14, 1966, Ser. No. 579,203
Claims priority, application Germany, Sept. 23, 1965, R 41,595
Int. Cl. C07c 69/54
U.S. Cl. 260—486          5 Claims This invention relates to a novel process for esterifying acrylic acid, more specifically this method pertains to a novel combination of variables which results in the obtention of acrylic acid esters in high yields by a simplified and more economic esterification which combination also includes the ester product recovery.

A number of processes are known which are directed to the conversion of acrylic acid and an alcohol to the corresponding acrylic ester in the presence of an esterification catalyst. However, the following problems exist: (a) ethyl acrylate, ethanol, and water form an azeotrope boiling at 77.1° C. at a pressure of 760 mm. of mercury, which azeotrope at a rather great expense can be processed further to recover the ester product; (b) the polymerization tendency of acrylic acid and its ester reduces to a considerable degree the alternatives which may be taken when carrying out the esterification reaction, i.e., when trying to minimize the losses due to polymerization.

Esterification of acrylic acid is possible in a liquid as well as in a gas phase. Of primary importance as an esterification catalyst is sulfuric acid and/or a sulfonic acid, e.g., p-toluene sulfonic acid. In respect to the amounts at which these catalysts have been utilized, German Patent No. 1,006,843 and published German patent application No. 1,161,259 teach, for example, that the catalyst should be used in amounts such as about 0.01% sulfuric acid per mole of acrylic acid.

The same magnitude of methyl sulfonic acid or mixtures of methyl-, ethyl-, and propyl sulfonic acid catalyst is utilized in a process disclosed in U.S. Patent 2,917,538. Further, in J. Org. Chem., vol. 20, on pp. 1030 to 1033, there is described a liquid phase esterification of methacrylic acid using 0.017 mole of p-toluene sulfonic acid as a catalyst.

It has now been found that acrylic acid and alcohols, especially lower alkyl alcohols of 1 to 6 carbon atoms, can be efficiently esterified while substantially avoiding the formation of the tertiary azeotrope, when carrying out the reaction at elevated temperautres in the presence of sulfuric acid or a sulfonic acid. The sulfonic acid used corresponds to the formula $HSO_3-R$ wherein R is aromatic, e.g., $-C_6H_5$; $-C_6H_4 \cdot CH_3$; $-C_6H_4SO_3H$; lower alkyl, e.g., $-CH_3$; $-C_2H_5$; and $-C_3H_8$. The novel esterification can be carried out by continuously introducing about equimolar amounts of acrylic acid and alcohol in a reboiler zone or "sump" of a reactor which reboiler zone contains acrylic acid or a mixture of acrylic acid and alcohol and one or more of the above-named sulfur-derived acids, and which reboiler zone at the existing pressure is at a temperature in excess of the boiling point of the formed ester or the ester-water azeotrope, respectively. It is surprising that, according to the novel procedure, only acrylic acid and not methacrylic acid will form the desired ester.

In order to achieve the desired reaction, i.e., the reducing of the formation of a ternary azeotrope of the ester, alcohol and water and obtaining only the ester-water mixture, contrary to the heretofore recognized methods, exceptionally large amounts of acid are necessary such as from 5 to 50% by weight of sulfuric acid or 10 to 80% by weight of the above described sulfonic acid or mixtures of the two acids (based on the weight of the reboiler content, i.e., of the sulfur-containing acid, acrylic acid and/or ester and alcohol mixtures). Preferably an amount of the acid is chosen, which comprises 7 to 35% by weight of the sulfuric acid or 20 to 70% by weight of the sulfonic acid on the basis of the reboiler contents. Considering the esterification speed and conversion and avoiding at the same time the formation of undesirable side reactants, the best results are obtained when using in the reboiler from 10 to 25% by weight of sulfuric acid or 30 to 50% by weight one of the aforementioned sulfonic acids.

The minimum temperature at which the esterification is achieved depends upon the boiling point of the formed acrylic acid ester, or the azeotrope formed from the acrylic acid ester and water, respectively, as well as whether one uses subatmospheric pressure, atmospheric pressure, or super-atmospheric pressure. In general, a reboiler temperature between 70 to 180° C. is employed.

The relationship of the introduced amounts of acrylic acid and alcohol in reference to the reboiler content, depends, in general, upon the available equipment, the amount of the sulfuric acid in the reboiler, and the esterification temperature.

Esterification of acrylic acid with the necessary amount of ethanol can, for example, be conducted by adding from one half to twice the amount of acrylic acid, based on the weight of the reboiler content, when employing about 20% by weight of p-toluene sulfonic acid in the reboiler, which is at a temperautre of 140° and at a pressure of 760 mm. Hg.

It is assumed that the novel esterification is accomplished apparently according to the reaction:

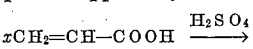

$$CH_2=C-\overset{O}{\underset{\|}{C}}-(-O-CH_2-CH_2-\overset{O}{\underset{\|}{C}})_{x-2}-O-CH_2-CH_2-COO(H)R$$

wherein in the reboiler, under the influence of the novel and larger amounts of the acid catalyst, the acrylic acid through condensation forms hydraacrylic acid oligoester, which ester esterifies with an alcohol at the carboxylic acid end, and which ester can further add alcohol and water at the terminal vinyl group. An hydraacrylic acid oligo ethyl ester can further split off the acrylic ester and can re-form from the introduced acrylic acid and alcohol. It must be assumed that according to the above reaction route the esterification rate of the oligo compound is considerably higher than the rate at which direct esterification of acrylic acid with alcohol is achieved, which esterification in respect to the heretofore known esterification in the presence of the slight amounts of acid no alcohol would leave as a component of the tertiary azeotrope.

It has been established that advantageously the mixture forming in the reboiler and consisting or acrylic acid, and sulfuric acid or sulfonic acid, respectively, additionally also alcohol, be heated for at least 30 minutes to reach the temperature of reaction before introducing into it the acrylic acid and alcohol mixture (or the separate streams thereof). In that event, the esterification takes place immediately and as desired, i.e., at the head of the column substantially only the ester-water azeotrope is recovered.

The increase of the sulfuric acid content in the reboiler in excess of the limits specified herein is not recommended because of increasing ether compound formation.

Example 1

In a heated reactor provided with a thermometer, stirring, feed, and recovery means, and which reactor's "reboiler" contained 600 grams of p-toluene sulfonic acid and 400 grams acrylic acid, a mixture of 580 grams of acrylic acid and 390 grams ethanol was introduced. The reboiler temperature was 125° C. A pressure of 200 mm.

Hg existed in the apparatus. The formed acrylic acid ethyl ester together with the water of reaction and slight amount of water originating from the industrial acrylic acid was removed through a column and an attached pressure-equalizing cooler. A slight excess of about 0.05 mole per mole of acrylic acid of alcohol was found at the head of the column. During 35 hours an hourly average of 960 grams of distillate were recovered. The distillate formed layers. The upper water-containing ester layer and the lower ester-containing water layer were divided and worked up separately. According to the described procedure, on the average about 768 grams of acrylic acid ethyl ester were isolated per hour. On the basis of the introduced acrylic acid, this amount corresponds to a yield of 95.2%.

Example 2

In a semi-works installation, which in its construction basically corresponds to the apparatus described in Example 1, into a reboiler mixture of 160 kilograms acrylic acid and 40 kilograms 100.3% sulfuric acid, on an hourly basis, 200 kilograms of acrylic acid and 150 kilograms of ethanol were introduced continuously. During an operation of 180 days, 1166 metric tons of raw ester were recovered. On an average hourly basis, it corresponds to 270 kilograms of acrylic acid ethyl ester being produced. On the basis of the acrylic acid introduced hourly, it corresponds to a yield of 97%.

Although the reboiler contents turned to a brownish-black color within a short time, nevertheless, it is still useful for the esterification of the additional acrylic acid.

We claim:

1. A process for forming an acrylic acid ester by continuously esterifying acrylic acid with aliphatic alcohols from 1 to 6 carbon atoms which process comprises the steps of (a) maintaining in a reboiler zone of the reaction zone, at a temperature in excess of the boiling point of the acrylic ester-water mixture, sulfuric acid or a sulfonic acid of the formula $HSO_3$—R wherein R is alkyl or aromatic, and wherein the sulfuric acid is from 5 to 50% parts by weight, or said sulfonic acid is from 10 to 80% parts by weight based on the reboiler contents, which contents besides the sulfuric acid or sulfonic acid contain acrylic acid, the acrylic acid ester and an alcohol precursor of the acrylic acid ester, (b) continuously introducing into said reboiler zone about an equimolar amount of acrylic acid and alcohol, and (c) continuously withdrawing from the reaction zone as a distillate product substantially only the acrylic acid ester and water mixture.

2. A process according to claim 1 wherein the reboiler zone is being maintained at a temperature of 70 to 180° C. when operating at atmospheric pressure.

3. A process according to claim 1 wherein the amount of acrylic acid by weight which is introduced into the reboiler is of from one half to twice the amount by weight of the contents in the reboiler zone.

4. A process according to claim 1 wherein the sulfuric acid content of the reboiler zone is from 7.5 to 35% by weight.

5. A process according to claim 1 wherein the sulfonic acid content of the reboiler zone is from 20 to 70% by weight.

References Cited

UNITED STATES PATENTS

| 2,464,768 | 3/1949 | Redmon et al. | 260—486 |
| 3,337,610 | 8/1967 | Bellringer et al. | 260—486 |

FOREIGN PATENTS

| 1,003,007 | 9/1965 | Great Britain. |
| 1,417,400 | 10/1965 | France. |

LORRAINE A. WEINBERGER, Primary Examiner

A. P. HALLAIN, Assistant Examiner